US008224086B2

(12) United States Patent
Christie

(10) Patent No.: US 8,224,086 B2
(45) Date of Patent: *Jul. 17, 2012

(54) METHODS AND APPARATUSES FOR RESTORING COLOR AND ENHANCING ELECTRONIC IMAGES

(75) Inventor: Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,473

(22) Filed: Mar. 10, 2011

(65) Prior Publication Data
US 2011/0216972 A1 Sep. 8, 2011

Related U.S. Application Data

(63) Continuation of application No. 12/057,253, filed on Mar. 27, 2008, now Pat. No. 7,916,941, which is a continuation of application No. 10/652,349, filed on Aug. 29, 2003, now Pat. No. 7,369,699.

(51) Int. Cl.
G06K 9/00 (2006.01)
(52) U.S. Cl. ...................................... 382/167
(58) Field of Classification Search .................. None
See application file for complete search history.

(56) References Cited

U.S. PATENT DOCUMENTS

| 4,381,890 A | 5/1983 | Wallace |
| 4,473,289 A | 9/1984 | Wallace |
| 4,605,955 A | 8/1986 | Hashimoto et al. |
| 4,745,467 A * | 5/1988 | Sekizawa et al. ............. 358/523 |
| 4,811,086 A | 3/1989 | Hieda |
| 4,829,383 A | 5/1989 | Harase et al. |
| 5,016,091 A | 5/1991 | Choi |
| 5,016,094 A | 5/1991 | Kaneko |
| 5,045,928 A | 9/1991 | Takaiwa et al. |
| 5,070,407 A | 12/1991 | Wheeler et al. |

(Continued)

FOREIGN PATENT DOCUMENTS

CN 1313004 A 9/2001

(Continued)

OTHER PUBLICATIONS

Centre for Systems Science, Simon Fraser University, "Colour Constancy Algorithms", 10 pages, 1999.

(Continued)

Primary Examiner — Yuzhen Ge
(74) Attorney, Agent, or Firm — Blakely, Sokoloff, Taylor & Zafman LLP

(57) ABSTRACT

Methods and apparatuses for color image restoration and enhancement. In at least one embodiment, color signals for individual channels of an image (e.g., red, green, or blue) are adjusted based on a weighted set of averages (e.g., of the entire image, the center portion, the surrounding portion, or other portions). In one example, pixels with extreme values of color signals (e.g., pure black or white pixels) are ignored for the purposes of restoring color; and, the different averages are weighted according to the pixel location (e.g., the distance from the pixel to a center point). In one example, after color restoration for individual channels, the luminance of each pixel is adjusted back to their original levels; and the range of luminance of the image is further adjusted to provide improved brightness and contrast, where in determining the luminance the red, green and blue color channels are given an equal weight.

2 Claims, 9 Drawing Sheets

U.S. PATENT DOCUMENTS

| | | | |
|---|---|---|---|
| 5,134,466 A | 7/1992 | Taek-hyun | |
| 5,148,288 A | 9/1992 | Hannah | |
| 5,153,717 A | 10/1992 | Nitta | |
| 5,198,890 A | 3/1993 | Suga | |
| 5,294,989 A | 3/1994 | Moore et al. | |
| 5,434,958 A | 7/1995 | Surma et al. | |
| 5,504,525 A | 4/1996 | Suzuki | |
| 5,619,260 A | 4/1997 | Miyadera | |
| 5,703,644 A | 12/1997 | Mori et al. | |
| 5,760,930 A | 6/1998 | Fukuzawa et al. | |
| 5,784,180 A | 7/1998 | Sakai et al. | |
| 5,883,973 A | 3/1999 | Pascovici et al. | |
| 5,926,218 A | 7/1999 | Smith | |
| 5,973,802 A | 10/1999 | Hirota et al. | |
| 6,038,339 A | 3/2000 | Hubel et al. | |
| 6,141,033 A | 10/2000 | Michael et al. | |
| 6,151,410 A | 11/2000 | Kuwata et al. | |
| 6,346,994 B1 | 2/2002 | Inoue | |
| 6,553,135 B1 | 4/2003 | Douglass et al. | |
| 6,587,593 B1 * | 7/2003 | Matsuoka et al. | 382/260 |
| 6,710,806 B1 * | 3/2004 | Satoh | 348/350 |
| 6,771,272 B2 | 8/2004 | Deering | |
| 6,831,687 B1 * | 12/2004 | Suzuki | 348/251 |
| 6,895,112 B2 | 5/2005 | Chen et al. | |
| 6,917,720 B1 | 7/2005 | Caesar et al. | |
| 6,952,503 B2 | 10/2005 | Matsuura | |
| 6,982,756 B2 * | 1/2006 | Nakamura | 348/241 |
| 6,985,628 B2 | 1/2006 | Fan | |
| 7,006,708 B1 | 2/2006 | Nako et al. | |
| 7,027,646 B2 * | 4/2006 | Shiiyama | 382/168 |
| 7,057,768 B2 | 6/2006 | Zaklika et al. | |
| 7,068,840 B2 | 6/2006 | Risson | |
| 7,184,080 B2 | 2/2007 | Kehtarnavaz et al. | |
| 7,257,251 B2 | 8/2007 | Matthews | |
| 7,259,784 B2 | 8/2007 | Cutler | |
| 7,535,511 B2 | 5/2009 | Wu et al. | |
| 7,570,287 B2 * | 8/2009 | Tsuruoka | 348/241 |
| 7,576,797 B2 | 8/2009 | Kehtarnavaz et al. | |
| 7,760,955 B2 * | 7/2010 | Liege et al. | 382/254 |
| 2002/0005855 A1 | 1/2002 | Mehigan | |
| 2002/0044215 A1 | 4/2002 | Takagi et al. | |
| 2002/0089514 A1 | 7/2002 | Kitahara et al. | |
| 2002/0130959 A1 | 9/2002 | McGarvey | |
| 2002/0141638 A1 | 10/2002 | Lee et al. | |
| 2002/0181768 A1 * | 12/2002 | Kim et al. | 382/165 |
| 2002/0196335 A1 | 12/2002 | Ozawa | |
| 2003/0026476 A1 * | 2/2003 | Shiiyama | 382/165 |
| 2003/0156752 A1 | 8/2003 | Turpin et al. | |
| 2003/0179926 A1 | 9/2003 | Yamazoe et al. | |
| 2003/0189579 A1 | 10/2003 | Pope | |
| 2004/0125215 A1 | 7/2004 | Wallace | |

FOREIGN PATENT DOCUMENTS

| | | |
|---|---|---|
| EP | 1107176 A | 6/2001 |
| EP | 1289269 A | 3/2003 |
| EP | 1292112 A1 | 3/2003 |

OTHER PUBLICATIONS

Charles Rosenberg, "Image Color Constancy Using EM and Cached Statistics", *ICML00*, Palo Alto, CA, 8 pages, 2000.

Kobus Barnard, "Modeling Scene Illumination Colour for Computer Vision and Image Reproduction: A survey of computational approaches", Computing Science at Simon Fraser University, 39 pages, Dec. 1998.

Graham D. Finlayson, et al., "Comprehensive Colour Image Normalization", 16 pages, Jun. 1998.

Ron Gershon, et al., "From [R, G, B] to Surface Reflectance: Computing Color Constant Descriptors in Images", IJCAI, Milan, 7 pages, 1987.

PCT International Report on Patentability and Written Opinion for PCT/US2005/035074, mailed Apr. 12, 2007, 12 pgs.

PCT International Search Report and Written Opinion for PCT/US2005/035074, mailed Apr. 25, 2006, 19 pgs.

PCT Invitation to Pay Additional Fees for PCT/US2005/035074, mailed Feb. 13, 2006, 6 pgs.

Jan Esmann, "PR Studio-Black & White-1.0-Userguide", Copyright 2003.

Gernot Hoffmann, "Luminance Models for Grayscale Conversions," Mar. 30, 2008, 11 pgs.

* cited by examiner

METHODS AND APPARATUSES FOR RESTORING COLOR AND ENHANCING ELECTRONIC IMAGES The present application is a continuation of U.S. application Ser. No. 12/057,253, filed Mar. 27, 2008 now U.S. Pat. No. 7,916,941, which is a continuation of U.S. application Ser. No. 10/652,349, filed Aug. 29, 2003 now U.S. Pat. No. 7,369,699.

FIELD OF THE INVENTION

The invention relates to color correction, and more particular to color restoration and enhancement for electronic color images.

BACKGROUND

The color of a light-reflecting object changes as the color of the background environment changes. For example, a white table, which is white under a standard illumination condition, appears red when it is illuminated with a light source of red; and, a red ball photographed under incandescent light looks quite different than the same red ball photographed outdoors on a cloudy day. Thus, the illumination conditions typically cause distortion in the color image captured by an imaging device. However, a human observer in the same environment can discount the influence of the background light. For example, the human observer can tell that it is a white table (or red ball) in relation with the colors of other objects and the background in the scene. The degree of independence of the object color on the illumination condition is called color constancy. The problems of color constancy affect conventional as well as digital images (e.g., still images or video images).

When capturing images, imaging devices (e.g., digital still cameras and digital video cameras, scanners) record the signals according to the sensed light coming from the objects in the scene to generate an electronic image. Thus, the recorded image data are highly dependent on the environment conditions (e.g., the intensity and color of the background light). For example, an image taken under tungsten illumination may appear reddish; and, an image taken under fluorescent lighting may appear greenish. The digital data from the digital cameras can be manipulated using software programs (or, hardware circuits) for image enhancement and color corrections. For example, color constancy algorithms known in the art can be used to restore the color of an electronic image.

The Retinex theory was developed by Land to predict human color perception. Color constancy algorithms were developed as components of Land's Retinex theories, which are the basis for many other color constancy algorithms. Land's color constancy algorithms require the calculation of a different average for each individual pixel examined.

The gray world algorithm is a basic color constancy algorithm, which assumes that the means of each of the red, green and blue channels over the entire image form a fixed ratio under the canonical illuminant. Since the fixed ratio is not typically known, frequently, it is assumed that the fixed ratio represents a gray color. Thus, the gray world algorithm typically corrects the average of the image to gray.

The white patch algorithm is another basic color constancy algorithm, which assumes that the peak values in each color channel represent the maximum possible reflectance of that component of the illuminant. Thus, the image is corrected according to the prior knowledge about the maximum possible reflectance.

Many sophisticated color constancy algorithms have been developed in the field of machine color constancy so that image data that is independent from environment illuminant can be extracted to improve the performance of machine vision and image database algorithms. However, these algorithms are typically intensive in computation.

SUMMARY OF THE DESCRIPTION

Methods and apparatuses for color image restoration and enhancement are described here. Some of the embodiments of the present invention are summarized in this section.

In at least one embodiment of the present invention, color signals for individual channels of an image (e.g., red, green, or blue) are adjusted based on a weighted set of averages of the color signals in the corresponding channels (e.g., an average of the center portion of the image, an average of the surrounding area of the image, an average of the overall image, or others). In one example, pixels with extreme values of color signals (e.g., pure black pixels and pure white pixels) are considered invalid for the purposes of restoring color and therefore are ignored and copied unchanged from the original image to the final image. In one example, the weights for different averages for the restoration of an individual pixel depend on the location of the pixel in the image (e.g., depending on the distance from the pixel to a selected point in the image). In one example, after the color signals are adjusted for individual channels for color restoration, the luminance of each pixel is restored to that of the corresponding pixel in the original image. In one example, the red, green and blue channels are given an equal weight in determining the luminance (e.g., using the sum of the red, green and blue signals of a pixel). In one example, the range of luminance of the image is further adjusted (e.g., stretched linearly or nonlinearly) to provide improved brightness and contrast. In one example, the boundary portion of the image is further darkened to enhance the overall appearance of the image.

In one aspect of the present invention, a method to transform an electronic image includes: determining one or more averages of a color channel (e.g., red, green, or blue) for the image by excluding one or more first pixels of the image, each of which is one of: a) substantially white, and b) substantially black; and, scaling color signals of the color channel for second pixels of the image according to the one or more averages, where each of the second pixels is not one of: a) substantially white, and b) substantially black. In one example, the one or more averages are determined by further excluding one or more pixels of the image, each of which has at least one color component that is one of: a maximum allowable value and a minimum allowable value. In one example, the one or more averages include at least two of: a) an average for a center portion of the image; b) an average for a surrounding portion of the image; and c) an average for the image. In one example, each of the color signals is scaled with respect to a signal of a selected color in the color channel by a factor which is a function of: the one or more averages and a distance to a selected point in the image. In one example, each of the color signals is scaled by the one or more averages to generate respectively one or more signals that are weighted according to a distance to a selected point in the image. In one example, each of the color signals is scaled with respect to the signal of the color channel of a selected color (e.g., gray). In one example, each of the color signals is scaled further according to a distance to a selected point in the image. In one example, luminance levels of the second pixels are adjusted back to the levels before the color signals of the color channel are scaled. In one example, luminance levels of the second pixels are adjusted to stretch (e.g., linearly) the range of luminance levels of the second pixels to a predetermined range (e.g., a maximum allowable range). In one example, the luminance levels of the second pixels are determined with equal weights for all color channels which consist of red, green and blue channels. In one example, luminance levels for third pixels in a boundary region of the image are further decreased according to distances of the third pixels to a selected point in the image.

In another aspect of the present invention, a method to transform an electronic image includes: determining a plurality of averages of a color channel (e.g., red, green, or blue) for the image; and scaling color signals of the color channel for the image according to the plurality of averages (e.g., an average for a center portion of the image, an average for a surrounding portion of the image, an average for the image). In one example, the image comprises a frame of a video stream in a video conference; and, said scaling is performed in real time for the video conference. In one example, each of the color signals is scaled with respect to a signal of a selected color (e.g., gray) in the color channel by a factor which is a function of: the plurality of averages and a distance to a selected point in the image. In one example, each of the color signals is scaled by the plurality of averages to generate respectively a plurality of signals that are weighted according to a distance to a selected point in the image. In one example, the luminance levels of pixels of the image are adjusted back to levels which the pixels have before the color signals of the color channel are scaled. In another example, the luminance levels of pixels of the image are adjusted to stretch (e.g., linearly) the range of luminance levels of the pixels to a predetermined range (e.g., the maximum allowable range). In one example, the luminance levels are determined with equal weights for all color channels which consist of red, green and blue channels. In one example, the luminance levels for pixels in a boundary region of the image are decreased according to the distances of the pixels in the boundary region to a selected point (e.g., a center point) in the image.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessary to the same embodiment; and, such references mean at least one.

Figure 1:
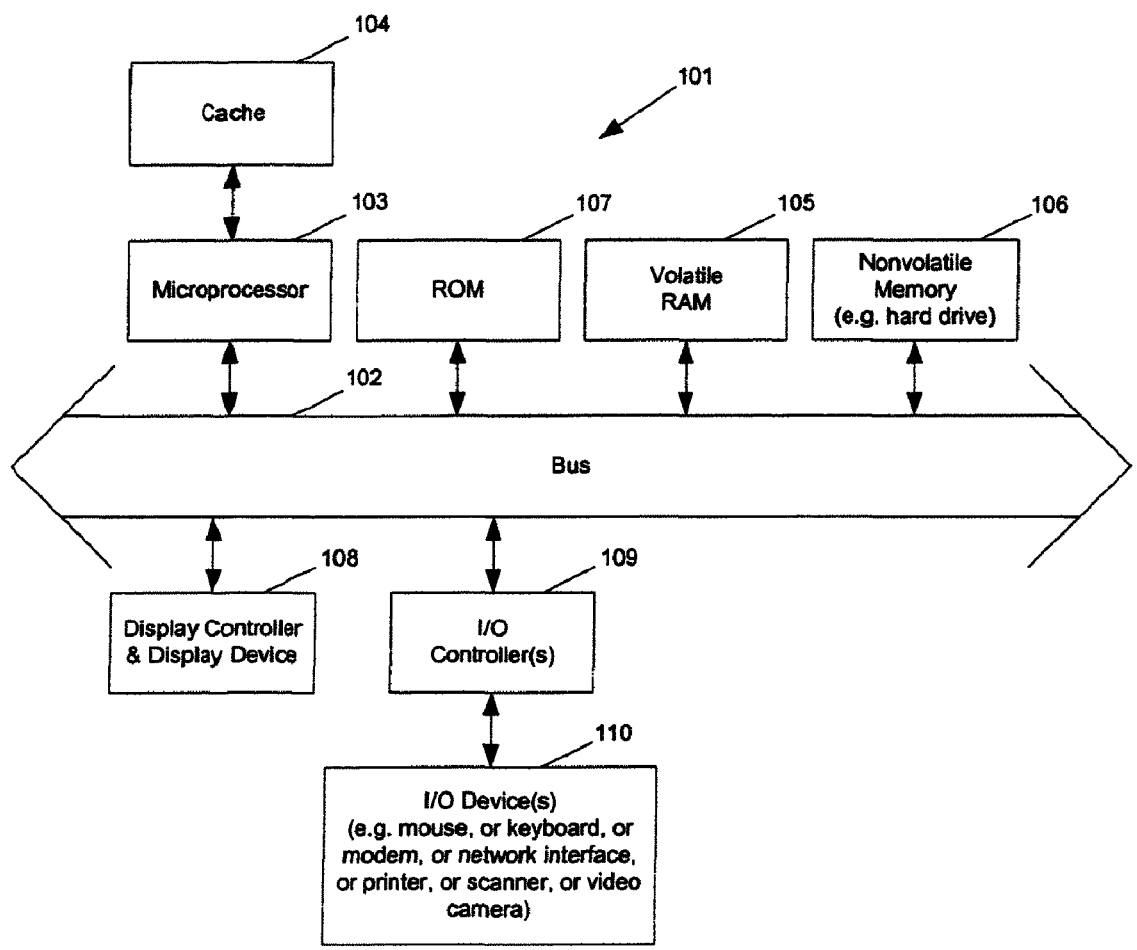
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Figure 2:
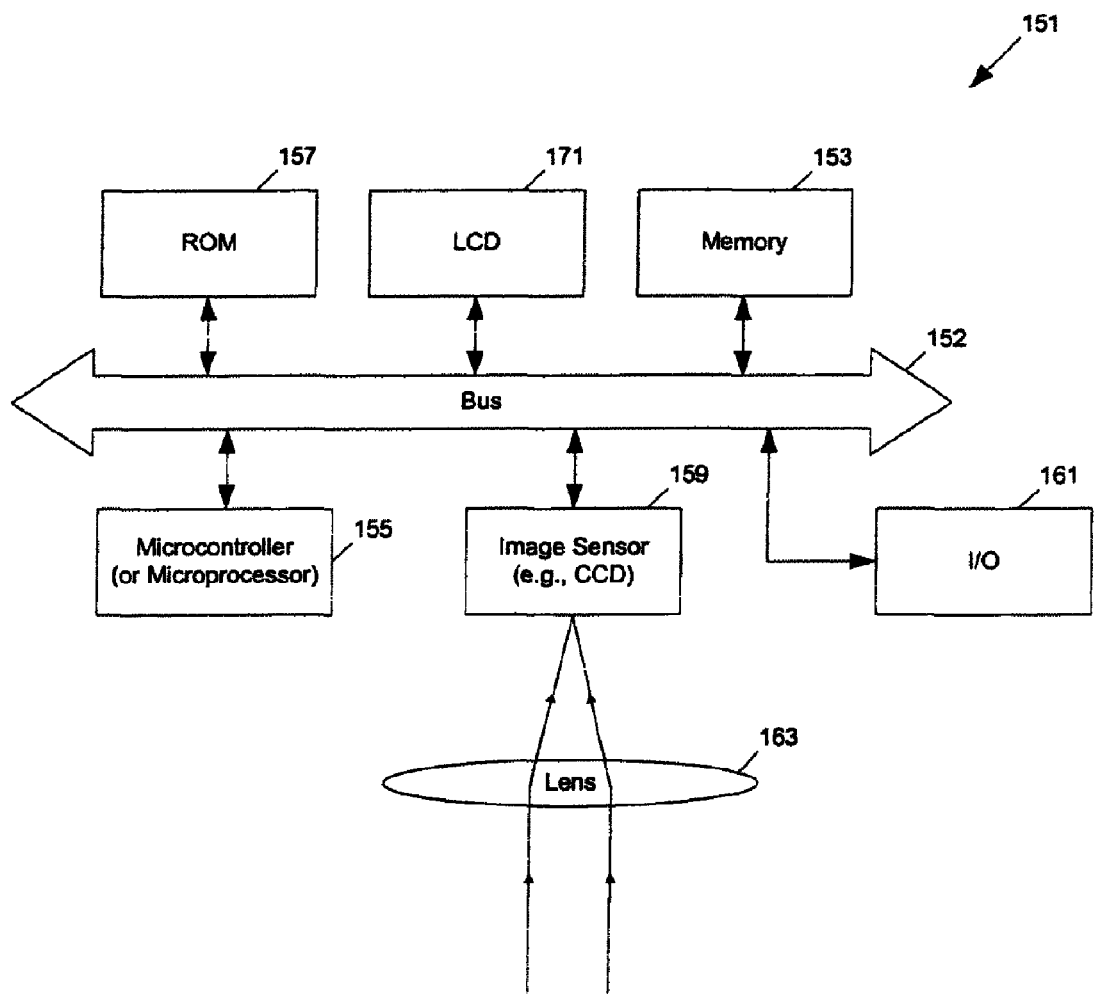
FIG. 2 shows an example of an image taking system which may be used in embodiments of the invention.

FIG. 2 shows an example of an image taking system which may be used in embodiments of the invention. This imaging device 151 may be, for example, a digital still or video (movie) camera. The imaging device 151 includes a microcontroller or microprocessor 155 which is coupled to a memory 153, an Input/Output (I/O) port 161, a CCD (Charge Coupled Device) image sensor 159, and a ROM (Read Only Memory) 157 by a bus 152. The imaging device 151 may also include a Liquid Crystal Display (LCD) 171, which is also coupled to the bus 152 and which may be used to display images which are captured or recorded by the imaging device 151. The LCD 171 serves as a viewfinder of a camera and there may optionally be other types of image display devices on imaging device 151 which can serve as a viewfinder. In one mode, the LCD display may further be used to display the user interface for setting the options for image restoration and enhancement and for displaying the transformed images. The imaging device 151 also includes an imaging lens 163 which can be disposed over CCD 159. The microprocessor 155 controls the operation of the imaging device 151; and, it may do so by executing a software program stored in ROM 157, or in the microprocessor 155, or in both ROM 157 and the microprocessor 155. The microprocessor 155 controls the image transformation operation; and, it controls the storage of a captured image in memory 153. The microprocessor 155 also controls the exporting of image data (which may or may not be color corrected) to an external general purpose computer or special purpose computer through one of the I/O ports 161. The microprocessor 155 also responds to user commands (e.g., a command to "take" a picture by capturing an image on the CCD and storing it in memory or a command to select an option for color restoration and image enhancement). The ROM 157 may store software instructions for execution by the microprocessor 155 and may also store the options (or preferences) for performing the image transformation. The memory 153 is used to store captured/recorded images which are received from the CCD 159. It will be appreciated that other alternative architectures of a camera can be used with the various embodiments of the invention.

Image capture devices are typically calibrated to correctly render a neutral gray tone accurately. Thus, in one embodiment of the present invention, an effective assessment is made of the true color of an object by comparing it to an idealized representation of a neutral gray tone. In one embodiment, color determination is accomplished by comparing the red, green and blue values of any given pixel of the image to averaged levels of red green and blue in the entire image; and, these relations are used regardless of the influence of any color cast in the illuminating light source. In one embodiment, comparisons are made through averaging different regions of the image and weighting those averages according to the distance from any given pixel. Once the color has been restored, additional adjustments to the image data are performed to restore the original luminance values in the image, and then to enhance the contrast of the image. As with the color restoration, the luminance restoration and contrast enhancement are performed in a manner consistent with values found in different regions of the image. In one embodiment of the present invention, the boundary regions of the image are darkened to enhance the overall appearance of the image.

In one embodiment of the present invention, the process of color restoration and enhancement is accomplished completely automatically according to a set of predetermined (or pre-selected) parameters. Alternatively, a human interface may be used to control various parameters for the image transformation.

In at least one embodiment of the present invention, pure black pixels and pure white pixels are excluded from the transformation. The black-and-white pixels are ignored in the determination of averages and copied without any changes from the original image to the final image. Thus, black pixels remain black; and, white pixels remain white. The color components of the black-and-white pixels have the maximum or minimum values. It cannot be determined whether these maximum or minimum values represent the correct values or the values beyond the extremes of the recorded images. Thus, the data for these black-and-white pixels are not considered for the purposes of restoring color and adjusting contrast. In another embodiment, substantially black and substantially white pixels are ignored in the manner described. In one case, a pixel is substantially black if it is within about 3% of each of the minimum channel values (e.g., RGB channel values) and a pixel is substantially white if it is within about 3% of each of the maximum channel values (e.g., RGB channel values).

Further, the pixels with one or more channels reaching the maximum or minimum may also be excluded from the computation of the averages (e.g., when their luminance values are below a lower threshold or above a higher threshold), since the corresponding components that have the maximum or minimum values may represent the values that are beyond the extremes of the recorded images.

Many color correction and image enhancement techniques weight different color channels differently in determining luminance, based on the differing response of the human eye to the different color channels. However, at least in some embodiments of the present invention, the red, green and blue are given an equal weight in determining luminance.

In one embodiment of the present invention, the structure of many images that contain center and surrounding areas of different content is considered. Since the center area and the surrounding area of an image may represent different objects at different locations, illuminated with different background environment light, different areas of the images are corrected differently with respect to different background values (e.g., according to the position of the pixel in the image).

Figure 7:
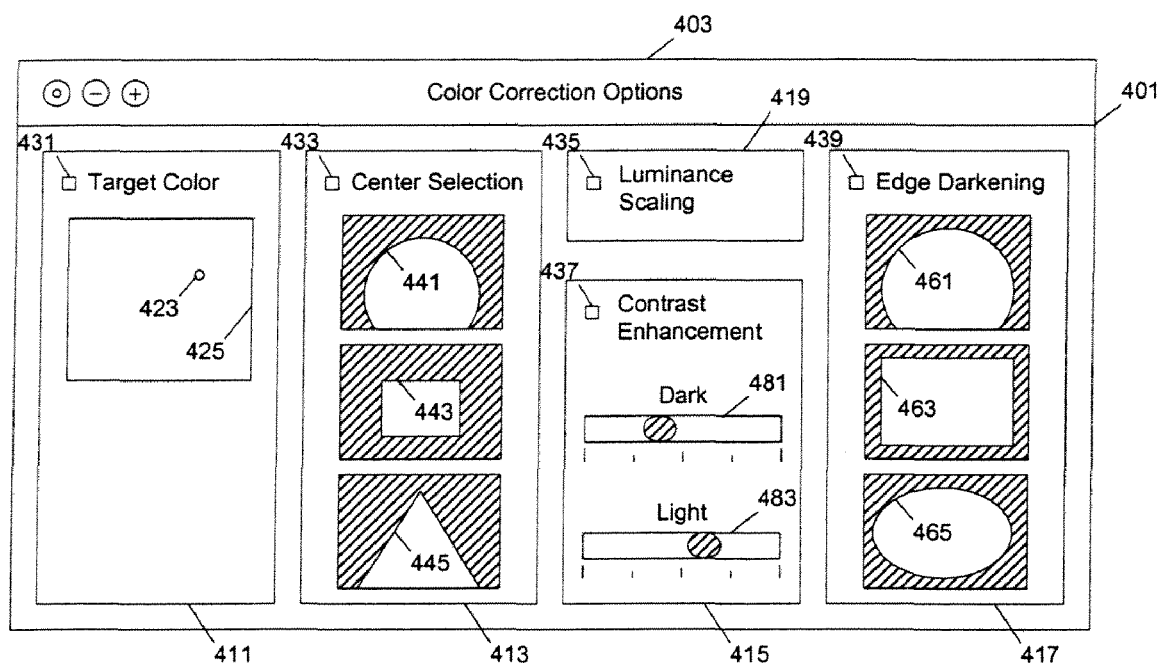
FIG. 7 shows an example user interface for adjusting parameters for transforming an image according to one embodiment of the present invention.

Similar to a gray world algorithm, in one embodiment of the present invention, the color signals of the individual color channels are corrected by the following expressions.

$$r_2(x,y)=r_t \times r_1(x,y)/R$$

$$g_2(x,y)=g_t \times g_1(x,y)/G$$

$$b_2(x,y)=b_t \times b_1(x,y)/B$$

where $\{r_t, g_t, b_t\}$ is the target color; $\{r_1(x,y), g_1(x,y), b_1(x,y)\}$ is the color before the correction for the pixel at (x,y); $\{r_2(x,y), g_2(x,y), b_2(x,y)\}$ is the color after the correction for the pixel at (x,y); and R, G and B are the average color values for the red, green and blue channels respectively, determined according to embodiments of the present invention. In one embodiment of the present invention, when the range for the color signals of all channels are defined within [0,1], the target color is selected as a neutral gray $\{r_t, g_t, b_t\}=\{0.5, 0.5, 0.5\}$. However, a user may select the target color based on a preference (e.g., using a graphical user interface as shown in FIG. 7). At least one embodiment of the present invention incorporates an adjustable (preferably automatically determined) target color for color restoration and enhancing for electronic images. In one embodiment, the averages for color restoration are weighted according to the location of the individual pixel that is being restored.

In a gray world algorithm, R, G and B are the averages of the corresponding color channels of all the pixels in the image. However, in at least one embodiment of the present invention, the R, G and B are the averages of the color channels of the entire image with certain pixels excluded. In one embodiment of the present invention, pure black pixels and pure white pixels are excluded from the calculation of R, G and B. A pure white pixel may represent a color in the scene with a luminance that exceeds the allowable range; and, a pure black pixel may represent another color in the scene with a luminance that is below a certain level. Thus, including the black-and-white pixels in the calculation of R, G and B may distort the color balance (although including the black pixels typically will not change the balance in the computed R, G and B, since the black pixels are typically represented with zero components for all the color channels). In one embodiment of the present invention, the calculation of R, G and B excludes the pixels with at least one component that reaches the extreme value (e.g., 0 or 1 when the allowable range is [0,1]), if the luminance of these pixels is below a lower threshold or above a higher threshold. Alternatively, any pixels with a color component reaching an extreme value (or substantially at the extreme value, as in the case where it is within 3% of the extreme value) may be excluded in the computation of R, G and B.

In one embodiment of the present invention, more than one average of the color channels are determined to establish an expression for R, G and B, depending on the position of the pixel in the image. For example, a center portion average and a surrounding portion average are obtained in one embodiment of the present invention to compute the R, G and B individually for each pixel based on these averages.

Figure 3:
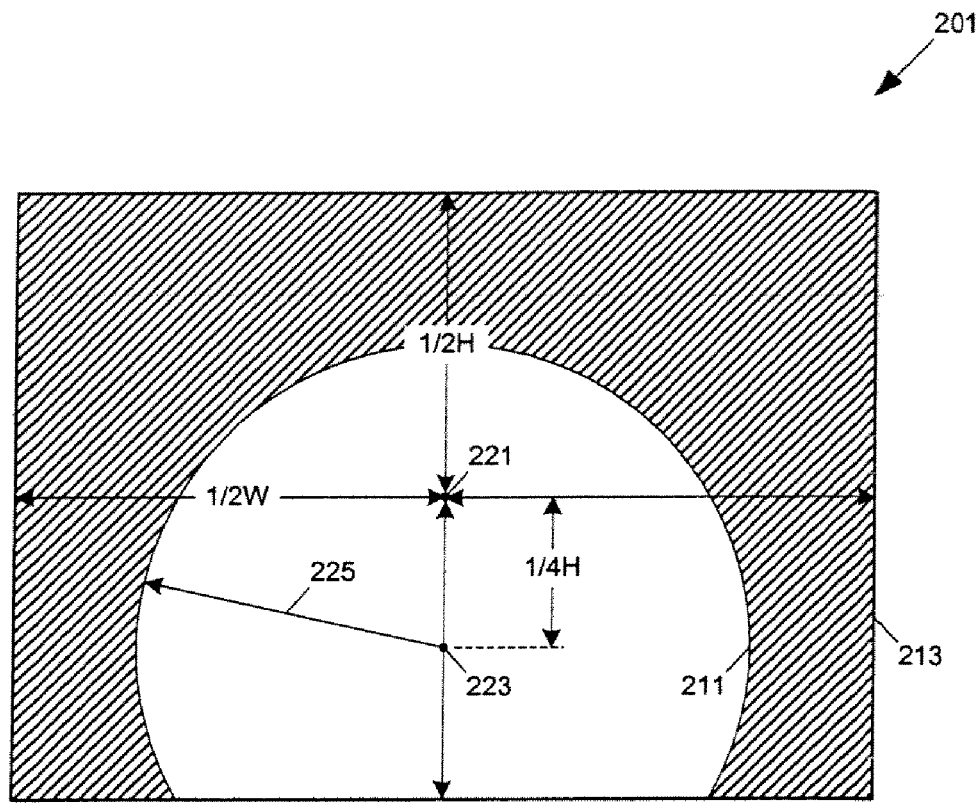
FIG. 3 shows an example of defining a center portion and a surrounding portion of an image for channel averaging according to one embodiment of the present invention.

FIG. 3 shows an example of defining a center portion and a surrounding portion of an image for channel averaging according to one embodiment of the present invention. FIG. 3 shows a typical image (201) in landscape. When taking the picture, the photographer typically places the objects of interest in the center portion (211) of the image. Thus, the background scene is in the surrounding area (213). Since the surrounding area and the objects of interest in the center portion of the image may be under different environment illumination condition, the averages of the two portions are separately computed. In one embodiment of the present invention, a circle defines the center region; the radius of the circle (225) is half the height of the image; and, the center of the circle (223) is one quarter of the height below the geometrical center of the image (221). Note that the center portion may not always be the portion of interest. For example, a portrait of two people, or a landscape, may have significant areas of interest around the edges of the image (in the surrounding region), where the center portion has no objects of interest. Note that the rules known in visual design composition can also be used for the definition of different portions, such as "rule of thirds", which states that if a frame is divided into thirds horizontally and vertically, the points where those dividing lines intersect are good locations for placement of main objects.

Figure 4:
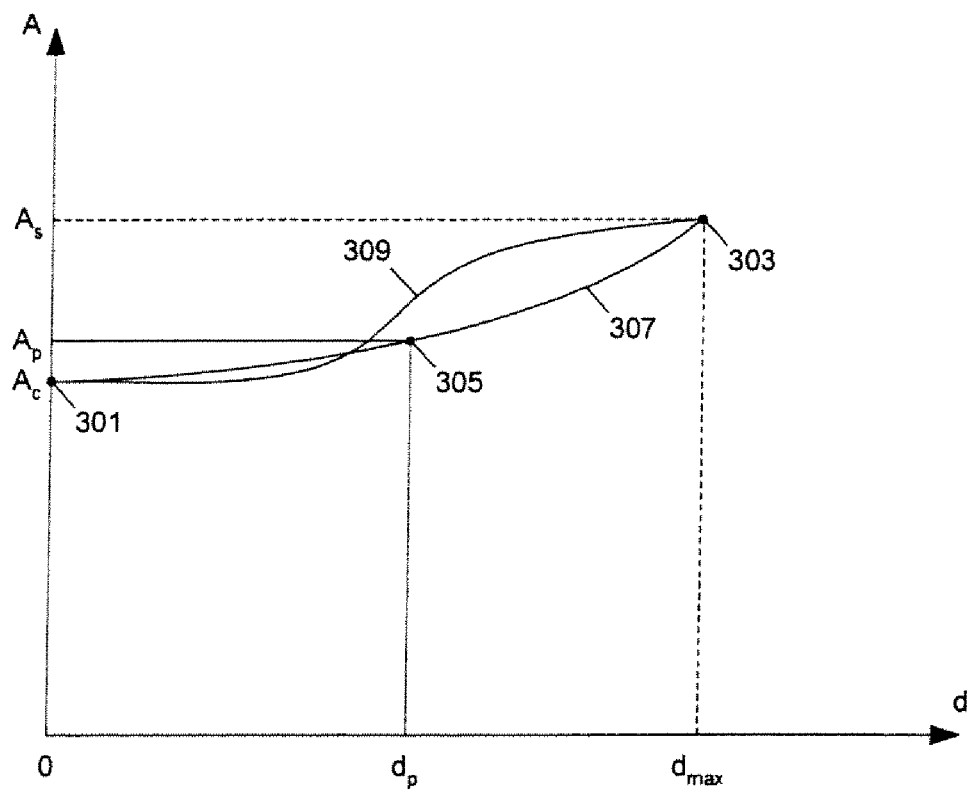
FIG. 4 shows an example of determining a channel average for scaling according to one embodiment of the present invention.

Once the averages for the color channels are determined for the different portions, the average values (R, G and B) for scaling a pixel at position (x,y) are then determined from the position (x,y) and the averages of the different portions. For example, if the average of one color channel for the center portion may be $A_c$ and the average of the same color channel for the surrounding portion may be $A_s$, the average for scaling the pixel, which is a distance d away from a center point (e.g., point 223), is determined from a function of $A_c$ and $A_s$ for the color channel. Note that an average for the entire image can be determined from the average for the center portion and the average for the surrounding region when the center portion and the surrounding region are not overlapping and have no gaps. In one embodiment of the present invention, the different regions (or portions) for computing the different averages can have overlapping and/or gaps. FIG. 4 shows an example of determining a channel average for scaling according to one embodiment of the present invention.

In FIG. 4, curve 307 shows the average for scaling as a function of the distance to the center. For example, at the center point the average for the center portion ($A_c$) is used for the scaling; at a point that is a distance of $d_{max}$ away from the center, the average for the surrounding portion ($A_s$) is used for the scaling; and, at a point that is a distance of $d_p$ away from the center, the average $A_p$ used for the scaling is a function of $A_c$ and $A_s$.

In one embodiment, R, G, and B are determined from $$R=R_c \times R_s/[R_s+(R_c-R_s) \times d/d_{max}]$$

$$G=G_c \times G_s/[G_s+(G_c-G_s) \times d/d_{max}]$$

$$B=B_c \times B_s/[B_s+(B_c-B_s) \times d/d_{max}]$$

In one embodiment, $d_{max}$ is the distance from the center to the farthest pixel in the image; in another embodiment, $d_{max}$ is a distance greater than the distance from the center to the farthest pixel in the image.

The above expressions show an example distribution of R, G, B as a function of the averages of different regions and the distance d. It is understood that different distributions may be used. For example, a distribution of the curve 309 may be used, which has a value that closely follows the average of the center region in the center region and the average of the surrounding region in the surrounding region.

Note that the above expressions can also be re-arranged as bellow.

$$r_2(x,y)=(1-d/d_{max})\times r_t\times r_1(x,y)/R_c+(d/d_{max})\times r_t\times r_1(x,y)/R_s$$

$$g_2(x,y)=(1-d/d_{max})\times g_t\times g_1(x,y)/G_c+(d/d_{max})\times g_t\times g_1(x,y)/G_s$$

$$b_2(x,y)=(1-d/d_{max})\times b_t\times b_1(x,y)/B_c+(d/d_{max})\times b_t\times b_1(x,y)/B_s$$

From the above expressions, it is seen that the corrected color $\{r_2(x,y), g_2(x,y), b_2(x,y)\}$ are the weighted averages of the input color $\{r_1(x,y), g_1(x,y), b_1(x,y)\}$ corrected according to different averages (e.g., $R_c$, $G_c$, $B_c$ and $R_s$, $G_s$, $B_s$), where the weight is a function of the distance to the center point (e.g., $(1-d/d_{max})$ and $(d/d_{max})$).

Such a color restoring operation for individual color channels typically changes the luminance of the individual pixels. In one embodiment of the present invention, after the scaling, all channels of the non-black-and-white pixels are equally scaled to bring the luminance of these pixels back to their original levels.

For example, following operations are applied in one embodiment.

$$r_3(x,y)=r_2(x,y)\times L_1(x,y)/L_2(x,y)$$

$$g_3(x,y)=g_2(x,y)\times L_1(x,y)/L_2(x,y)$$

$$b_3(x,y)=b_2(x,y)\times L_1(x,y)/L_2(x,y)$$

where $L_1(x,y)=r_1(x,y)+g_1(x,y)+b_1(x,y)$ and $L_2(x,y)=r_2(x,y)+g_2(x,y)+b_2(x,y)$.

Although the above example partitions an image into two regions (e.g., center area and surrounding area) for the correction of individual channels (e.g., through the determination of an average value for the correction of a pixel, or through the weighted combination of the corrections performed according to each of the averages), from this description, a person skilled in the art will understand that, in general, the image can be partitioned into a plurality of regions; and, the average (e.g., R, G or B) for the correction of one of the color channels for a pixel can be determined from a function of the averages over the plurality of regions and the position of a pixel in relation with the plurality of regions.

Further, in one embodiment, the range of the luminance level is stretched (e.g., to an maximum allowable range) to enhance the darkness and brightness. For example, when the maximum luminance and minimum luminance of the original image are: $L_{max}=\text{Max}(L_1(x,y)$ for all x, y) and $L_{min}=\text{Min}(L_1(x,y)$ for all x, y) and when the maximum allowable range is [0,1] for each channel, the red, green and blue channels are equally scaled according to:

$$r_4(x,y)=r_3(x,y)\times 3\times(L_1(x,y)-L_{min})/[(L_{max}-L_{min})\times L_1(x,y)]$$

$$g_4(x,y)=g_3(x,y)\times 3\times(L_1(x,y)-L_{min})/[(L_{max}-L_{min})\times L_1(x,y)]$$

$$b_4(x,y)=b_3(x,y)\times 3\times(L_1(x,y)-L_{min})/[(L_{max}-L_{min})\times L_1(x,y)]$$

Note that the above operations for scaling the luminance levels may be combined. For example, $$r_4(x,y)=r_2(x,y)\times 3\times(L_1(x,y)-L_{min})/[(L_{max}-L_{min})\times L_2(x,y)]$$

$$g_4(x,y)=g_2(x,y)\times 3\times(L_1(x,y)-L_{min})/[(L_{max}-L_{min})\times L_2(x,y)]$$

$$b_4(x,y)=b_2(x,y)\times 3\times(L_1(x,y)-L_{min})/[(L_{max}-L_{min})\times L_2(x,y)]$$

Figure 5:
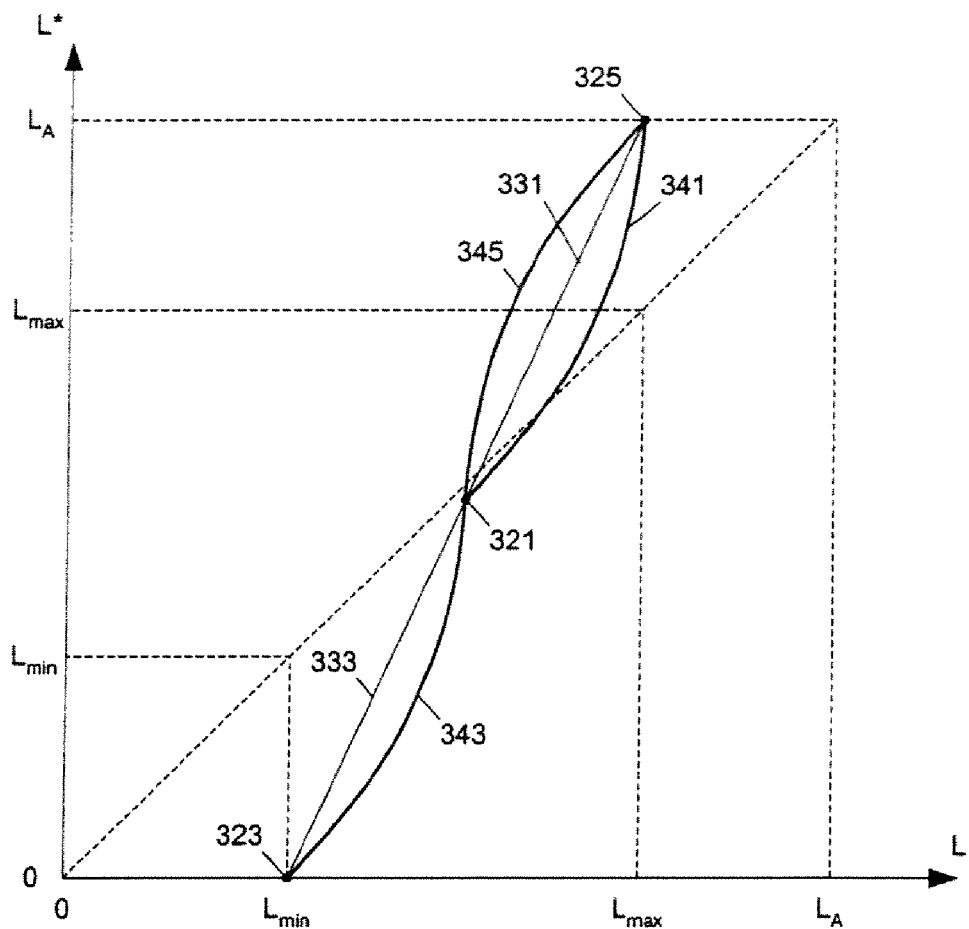
FIG. 5 shows examples of stretching the luminance range of an image according to one embodiment of the present invention.

FIG. 5 shows examples of stretching the luminance range of an image according to one embodiment of the present invention. A curve in FIG. 5 maps from an input luminance L to a target luminance L*. In one embodiment of the present invention, the luminance level is linear stretched (e.g., according to line segments 331 and 333). Further, nonlinear scaling is used in one embodiment of the present invention to enhance contrast. For example, curve 343 can be used for the darker portion (e.g., between points 321 and 323); and, the light portion (e.g., between points 321 and 325) may be scaled linearly using line segment 331, or nonlinearly using curve 345 or 341.

Figure 6:
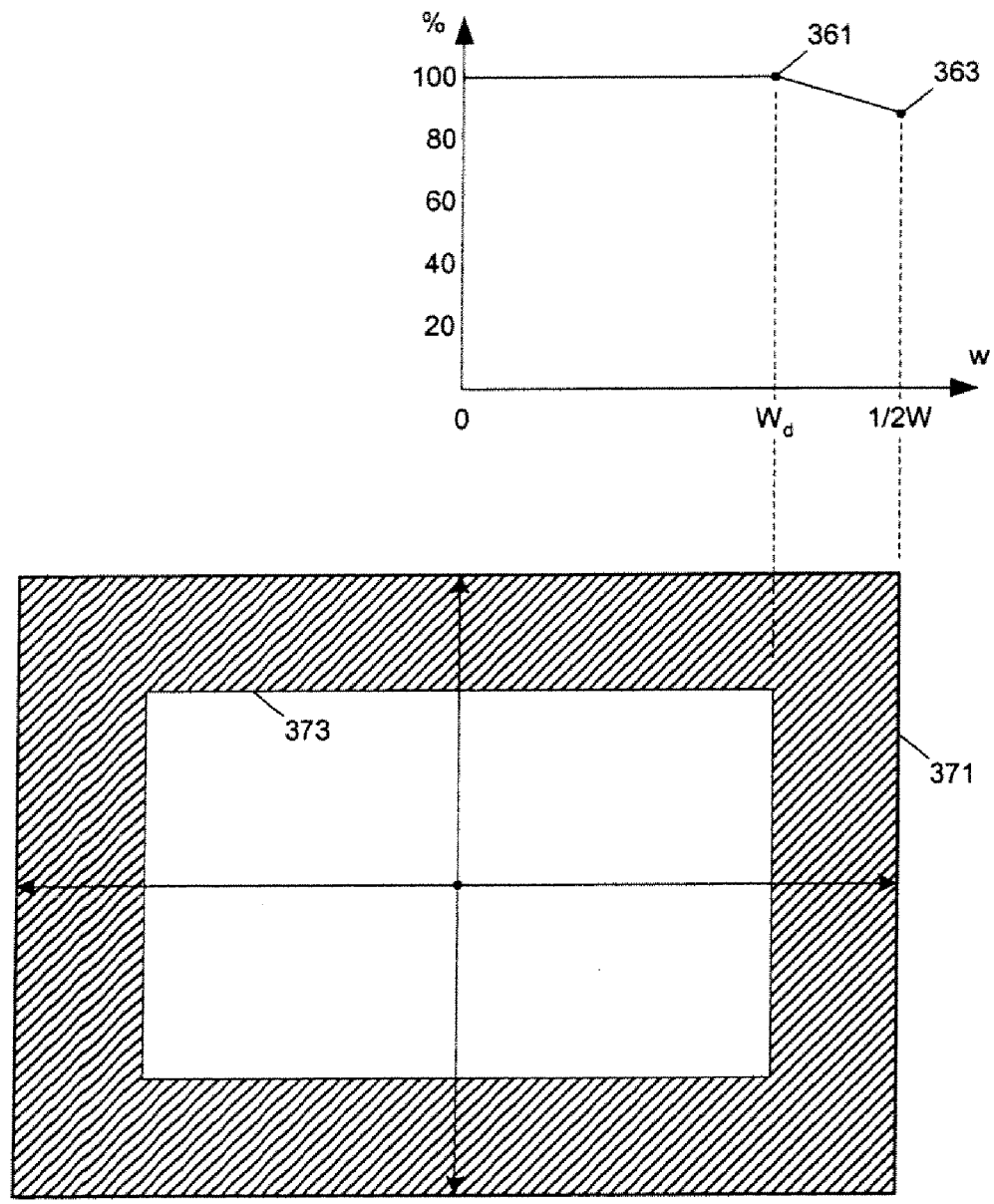
FIG. 6 shows an example of edge darkening according to one embodiment of the present invention.

In one embodiment of the present invention, to enhance the appearance of the image, the boundary portion of the image is darkened. FIG. 6 shows an example of edge darkening according to one embodiment of the present invention. In FIG. 6, the luminance of the boundary region (e.g., the portion outside region 373) is reduced by a percentage according to the distance to the center. For example, in one embodiment of the present invention, when the position of the pixel is between $[W_d, \frac{1}{2}W]$, where W is the width of the image and $W_d$ is a selected position, the signal level for each of the color channels of the pixel is reduced by a percentage indicated by the line segment between points 361 and 363.

For example, the edge darkening can be performed according to:

$$r_5(x,y)=r_4(x,y)\times f(x)\times g(y)$$

$$g_5(x,y)=g_4(x,y)\times f(x)\times g(y)$$

$$b_5(x,y)=b_4(x,y)\times f(x)\times g(y)$$

where $f(x)=\text{Max}([1-0.12\times(|x|-W_d)/(W/2-W_d)], 1)$; $g(y)=\text{Max}([1-0.12\times(|y|-H_d)/(H/2-H_d)], 1)$; x in $[-W/2, W/2]$; and y in $[-H/2, H/2]$.

Although the above example shows a linear scaling in the boundary area in each direction for edge darkening, it is understood that non-linear scaling can also be used. Further, different shapes and areas for defining the boundary area for darkening can also be used. Further, it is understood that edge darkening is optional; and, some embodiments of the present invention do not include edge darkening.

FIG. 7 shows an example user interface for adjusting parameters for transforming an image according to one embodiment of the present invention. In FIG. 7, window 401 shows a graphical user interface that may be implemented in a computer system for the selection of parameters that controls the transformation of image. For example, window 401 has a title bar 403 and panels (or frames) 411-419 for different types of options. Check buttons 431, 433, 435, 437 and 439 can be used to selectively enable the respective options in the panels. Panel 411 allows a user to specify the target color $\{r_t, g_t, b_t\}$. When it is not checked, a gray (e.g., $\{0.5, 0.5, 0.5\}$) is used. For example, a user may use a cursor-controlling device (e.g., a mouse, a touch pad, or a track ball, or others) to move a circle (423) to select a particular color from a continuous color palette (425); alternatively, any other methods known in the art for selecting a color can be used. Panel 413 allows a user to select the definitions of the center portion and the surrounding portion. A number of predefined configurations may be presented as radio button icons, such that a user can simply choose from one of them. Alternatively, the icons may further bring a window for the specification of the sizes and positions of the different regions. Furthermore, a drawing window may allow a user to draw the center portion (e.g., through receiving input from an input device which represent drawing actions and displaying the feedback of the received input interactively to show the result of the interpreted drawing actions). Panel 435 allows a user to select whether or not to stretch the luminance range. Further, an interface (not show in FIG. 7) may allow the user to specify the target range of the luminance if the user chooses to stretch the luminance range. Panel 437 allows the user to select the different types of scaling for the dark portion of the luminance range and the light portion of the luminance range. For example, when the scale (e.g., 481 or 483) is in the center, a linear scaling is used; when the scale is move to the left, a nonlinear scaling is according to a curve with a shape similar to that of curve 345 in FIG. 5; and when the scale is move to the right, a nonlinear scaling is according to a curve with a shape similar to that of curve 341 in FIG. 5. The scale controls the curvature of the luminance-scaling curve. Panel 417 allows a user to select whether or not to darken the boundary region. If the user chooses to darken the boundary region, radio icon buttons (e.g., 461-465) can be used to select a definition of the boundary region. Further, similar to the buttons for the selection of the center region, the radio buttons 461-465 may further bring windows for the specification of the dimensions and positions of predefined shapes of boundary regions. Further more, a user interface may allow the user to draw a shape to define the boundary regions.

Although the human interface is illustrated with an example in FIG. 7, from this description, one skilled in the art understands that various different types of user interfaces may be used for different types of data processing system, such as computers, palm top computers, still cameras, video cameras, and others. It is understood that different types of systems typically use different types of user interface elements (e.g., graphical user interface based, text based, icon based) and may offer different levels of details for the specification of options. Various types of user interface techniques known in the art can be used for the specification of the options of the present invention. Further, the user interface may present the resulting image interactively such that a user can observes the effects of changing options interactively.

Figure 8:
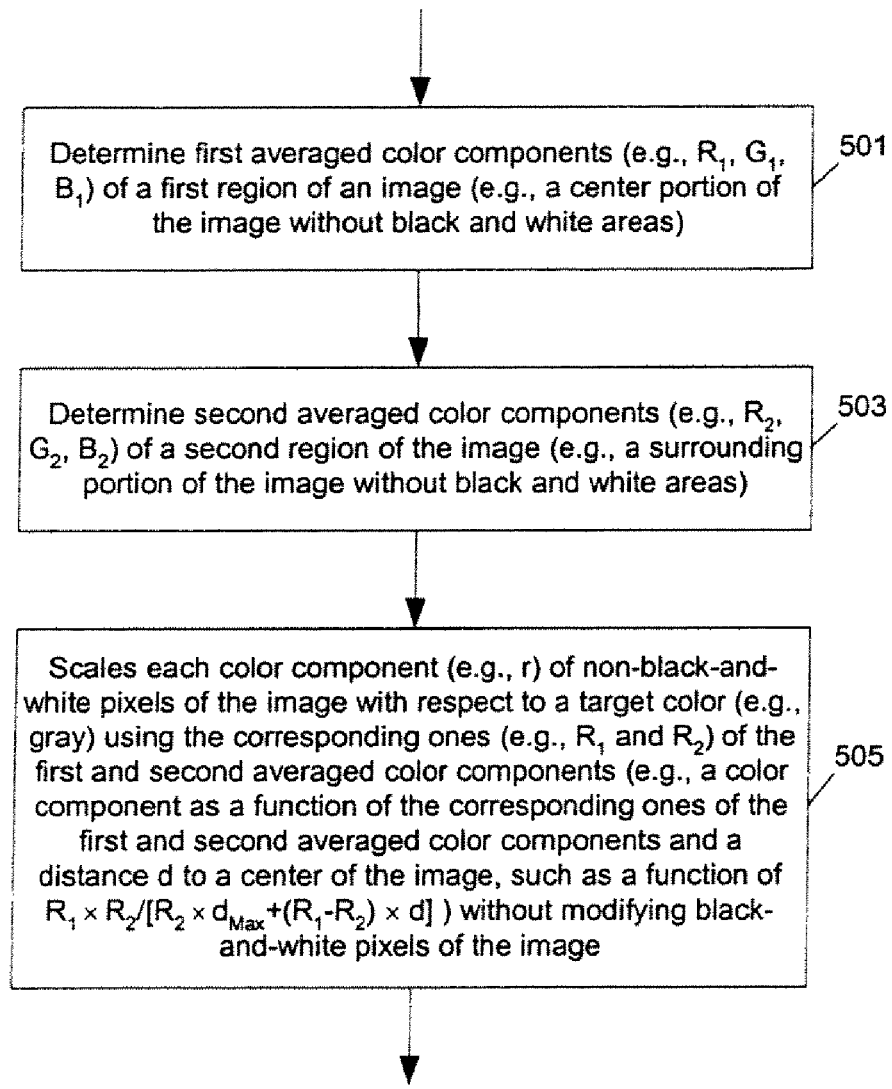
FIG. 8 shows a flow chart of a method to perform color correction according to one embodiment of the present invention.

FIG. 8 shows a flow chart of a method to perform color correction according to one embodiment of the present invention. Operation 501 determines first averaged color components (e.g., $R_1$, $G_1$, $B_1$) of a first region of an image (e.g., a center portion of the image without black and white areas). Operation 503 determines second averaged color components (e.g., $R_2$, $G_2$, $B_2$) of a second region of the image (e.g., a surrounding portion of the image without black and white areas). Operation 505 scales each color component (e.g., r) of non-black-and-white pixels of the image with respect to a target color (e.g., gray) using the corresponding ones (e.g., $R_1$ and $R_2$) of the first and second averaged color components (e.g., a color component as a function of the corresponding ones of the first and second averaged color components and a distance d to a center of the image, such as a function of $R_1 \times R_2 / [R_2 \times d_{max} + (R_1 - R_2) \times d])$ without modifying black-and-white pixels of the image.

Figure 9:
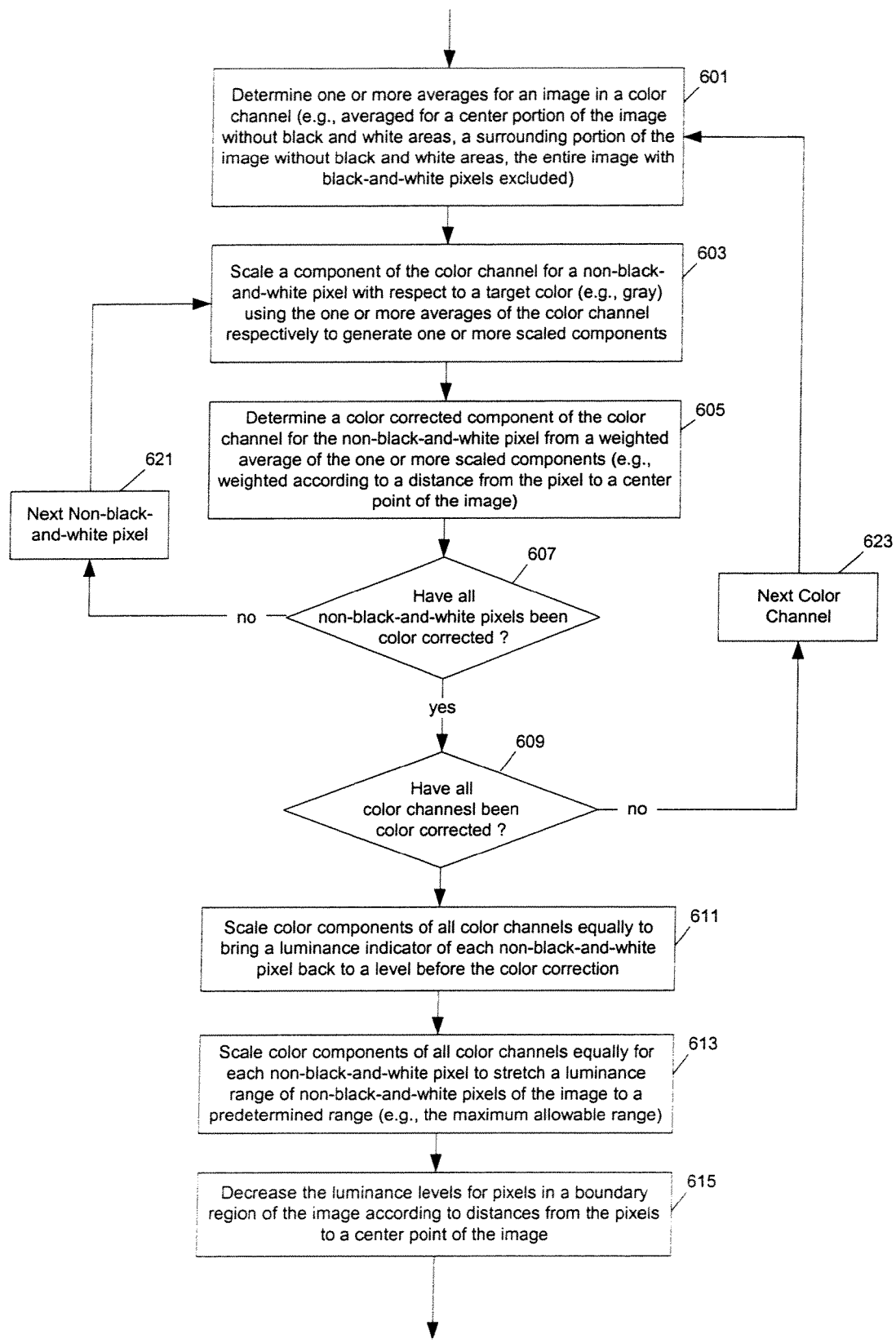
FIG. 9 shows a detailed method to transform an image according to one embodiment of the present invention.

FIG. 9 shows a detailed method to transform an image according to one embodiment of the present invention. Operation 601 determines one or more averages for an image in a color channel (e.g., averaged for a center portion of the image without black and white areas, a surrounding portion of the image without black and white areas, the entire image with black-and-white pixels excluded). Operation 603 scales a component of the color channel for a non-black-and-white pixel with respect to a target color (e.g., gray) using the one or more averages of the color channel respectively to generate one or more scaled components. Operation 605 determines a color corrected component of the color channel for the non-black-and-white pixel from a weighted average of the one or more scaled components (e.g., weighted according to a distance from the pixel to a center point of the image). Operations 603 and 605 are repeated until operation 607 determines that all non-black-and-white pixels have been color corrected. Operations 601-607 are repeated until operation 609 determines that all color channels have been color corrected. Operation 611 scales color components of all color channels equally to bring a luminance indicator of each non-black-and-white pixel back to a level before the color correction. Operation 613 scales color components of all color channels equally for each non-black-and-white pixel to stretch a luminance range of non-black-and-white pixels of the image to a predetermined range (e.g., the maximum allowable range). Operation 615 decreases the luminance levels for pixels in a boundary region of the image according to distances from the pixels to a center point of the image.

The foregoing description of the methods in FIGS. 8 and 9 assumes a particular process flow in which certain operations or actions follow other operations or actions. It will be appreciated that alternative flows may also be practiced with the present invention. Other alternative sequences of operations may be envisioned by those skilled in the art. Further, some of the operations can be performed in parallel. For example, the scaling for color restoration in individual color channels can be performed in parallel; and, the transformation for pixels or blocks of pixels can be performed in parallel, once the averages are obtained. While examples of the invention have involved the use of the RGB color space, embodiments of the invention may use other color spaces such as other tristimulus spaces or CMYK, etc.

The methods according to various embodiments of the present invention are simple and computationally efficient. Real time transformation can be performed on images of megapixels (or larger sizes) with consumer level computing resources. Thus, methods of the present application can be incorporated into image capturing devices not only for still images but also for video (or streaming) images. In a two-way video product, the methods of the present invention can used to improve the outbound images as well as the inbound images. The methods of the present invention can be implemented using dedicated hardware (e.g., using Field Programmable Gate Arrays, or Application Specific Integrated Circuit, which many be integrated with image sensors, such as CCD or CMOS based image sensors) or shared circuitry (e.g., microprocessors or microcontrollers under control of program instructions stored in a machine readable medium, such as memory chips) for an imaging device, such as system 151 in FIG. 2. The methods of the present invention can also be implemented as computer instructions for execution on a data processing system, such as system 101 of FIG. 1.

In one embodiment of the present invention, methods of the present inventions are implemented in video applications (e.g., implemented as a software module in video conference application programs, implemented as hardware circuits in video capturing devices, such as video cameras for computer or hand-held devices, for video monitoring, or for other video applications). In certain applications, it may not be essential to exactly record or shown the image as it may appear in the real world, which may be different under different illumination conditions and different environments (e.g., due to the direct and indirect illuminations). It may be desirable to restore the colors and enhance the image so that the image appears pleasing, clearly displaying the details in the image (e.g., the objects in the center portion of the image). For example, in a video conference, it may typically be expected that the face of the person in the conversation is in the center of the image. The image will be pleasing if the natural skin color of the face is properly shown in the image regardless of the color and intensity of the background light and environment condition. The effect of the environment condition on the appearance of the image is of less importance in such a video conference application. Embodiments of the present invention remove the influence from the environment condition, especially in the portion of the image that is typically of interest to a viewer (e.g., the center portion), to restore color and enhance the image so that the image appears pleasing. And, these methods are computationally efficient. In one embodiment of the present invention, the color restoration and image enhancement are performed in real time during the video conference (e.g., through a software module coupled to the video conference application program, or through hardware circuits in the video camera) such that the image appears to have pleasing colors and appropriate contrast for viewing and for the recognition of details.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory computer readable storage medium storing computer program instructions which when executed by a data processing system cause said system to perform a method to transform an electronic image, the method comprising:
   determining a plurality of averages of a color channel over a plurality of regions inside the image, each region corresponding to a continuous portion of two dimensional space having a plurality of pixels of the image and wherein each of the plurality of averages excludes one or more first pixels which are one of: substantially white or substantially black;
   determining a target color for the color channel, wherein the target color is gray;
   scaling color signals of the color channel for each pixel, in a second set of pixels, of the image according to the plurality of averages and the target color, wherein the plurality of averages comprises at least one of an average for a center portion of the image, an average for a surrounding portion of the image and an average for the image;
   adjusting luminance levels of pixels of the image to stretch a range of luminance levels of the pixels to a predetermined range; and
   decreasing luminance levels for pixels in a boundary region of the image according to distances of the pixels in the boundary region to a selected point in the image.

2. A data processing system to transform an electronic image, the data processing system comprising:
   means for determining a plurality of averages of a color channel over a plurality of regions inside the image, each region corresponding to a continuous portion of two dimensional space having a plurality of pixels of the image and wherein each of the plurality of averages excludes one or more first pixels which are either substantially black or substantially white;
   means for adjusting luminance levels of pixels of the image to stretch a range of luminance levels of the pixels to a predetermined range; and
   means for decreasing luminance levels for pixels in a boundary region of the image according to distances of the pixels in the boundary region to a selected point in the image.

* * * * *